United States Patent
Tagaki

(10) Patent No.: US 10,554,863 B2
(45) Date of Patent: Feb. 4, 2020

(54) IMAGE FORMING APPARATUS WITH AN IMPROVED CAPABILITY TO EDITED SELECTABLE DETECTED AREAS

(71) Applicant: KYOCERA Document Solutions Inc., Osaka (JP)

(72) Inventor: Koji Tagaki, Osaka (JP)

(73) Assignee: Kyocera Document Solutions, Inc. (JP)

( * ) Notice: Subject to any disclaimer, the term of this patent is extended or adjusted under 35 U.S.C. 154(b) by 0 days.

(21) Appl. No.: 15/973,204

(22) Filed: May 7, 2018

(65) Prior Publication Data
US 2018/0343363 A1    Nov. 29, 2018

(30) Foreign Application Priority Data
May 23, 2017   (JP) .................................. 2017-102172

(51) Int. Cl.
*H04N 1/60* (2006.01)
*H04N 1/00* (2006.01)
*G06T 11/60* (2006.01)

(52) U.S. Cl.
CPC ........... *H04N 1/6072* (2013.01); *G06T 11/60* (2013.01); *H04N 1/00461* (2013.01)

(58) Field of Classification Search
None
See application file for complete search history.

(56) References Cited

U.S. PATENT DOCUMENTS

| | | | |
|---|---|---|---|
| 2004/0102958 A1* | 5/2004 | Anderson, IV | G06F 17/2775 704/4 |
| 2010/0225980 A1* | 9/2010 | Fujishita | H04N 1/32112 358/488 |
| 2012/0050828 A1* | 3/2012 | Ohk | H04N 1/6072 358/518 |
| 2014/0033010 A1* | 1/2014 | Richardt | G06F 17/217 715/222 |

FOREIGN PATENT DOCUMENTS

JP    H02-220565    9/1990

* cited by examiner

*Primary Examiner* — Andrew H Lam

(57) ABSTRACT

An image forming apparatus includes a display device, an input device configured to receive a user operation, a preview processing unit configured to display as preview on the display device a document image as an output target, and an output processing unit configured to output the document image. Further, the preview processing unit (a) detects an area surrounded by a predetermined specific color in the document image and displays the document image as preview on the display device so as to make the detected area editable, and (b) add a text specified by the user operation in the detected area in accordance with the user operation. The output processing unit outputs the document image in which the text was added.

10 Claims, 3 Drawing Sheets

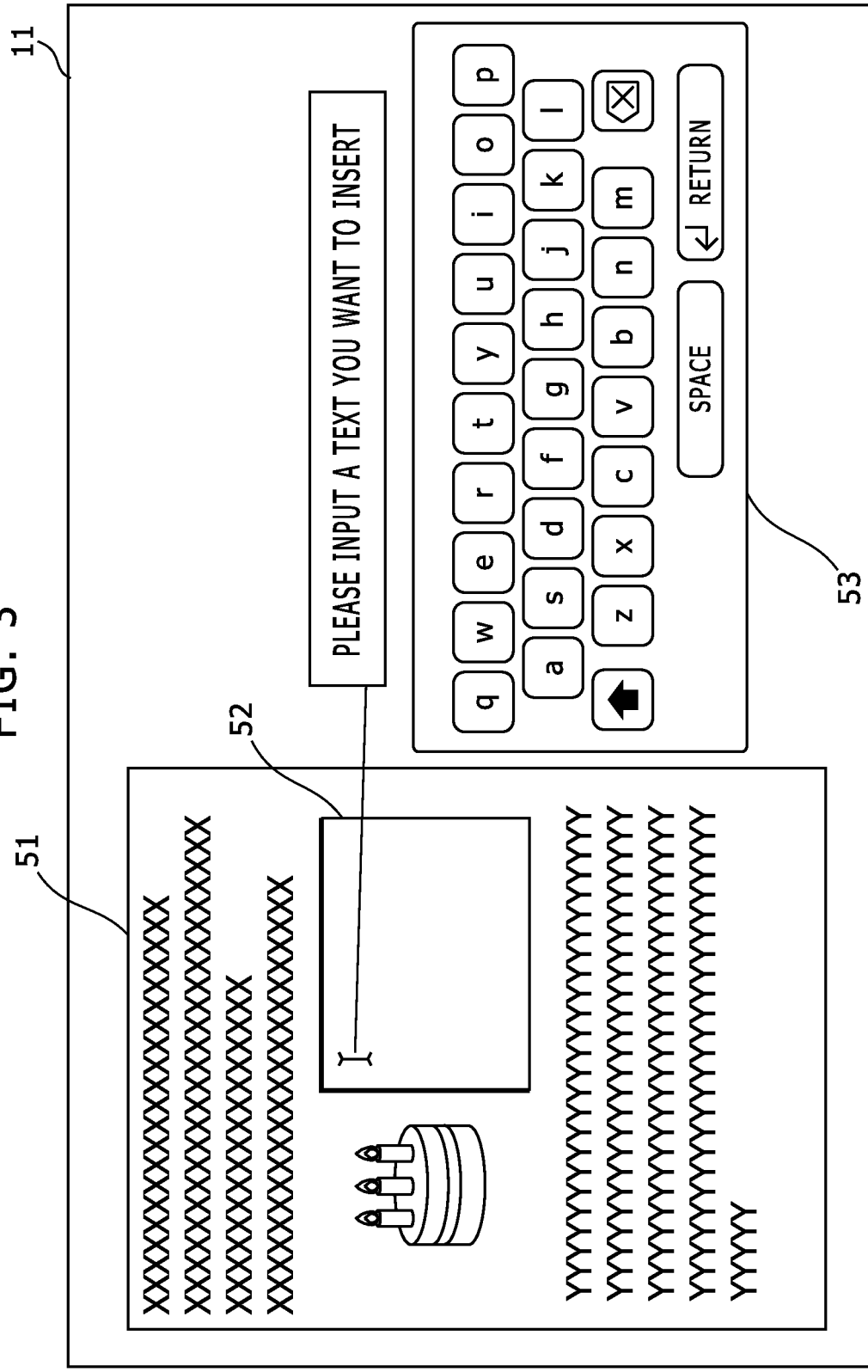

IMAGE FORMING APPARATUS WITH AN IMPROVED CAPABILITY TO EDITED SELECTABLE DETECTED AREAS

CROSS-REFERENCE TO RELATED APPLICATIONS

This application relates to and claims priority rights from Japanese Patent Application No. 2017-102172, filed on May 23, 2017, the entire disclosures of which are hereby incorporated by reference herein.

BACKGROUND

1. Field of the Present Disclosure

The present disclosure relates to an image forming apparatus.

2. Description of the Related Art

An image processing apparatus detects a marker color in a document image scanned by a scanner, and performs image processing such as removing, extracting or inverting for an area surrounded by the marker color.

However, for an area specified by a marker, the aforementioned image processing apparatus can perform only predetermined image processing.

SUMMARY

An image forming apparatus according to an aspect of the present disclosure includes a display device, an input device configured to receive a user operation, a preview processing unit configured to display as preview on the display device a document image as an output target, and an output processing unit configured to output the document image. Further, the preview processing unit (a) detects an area surrounded by a predetermined specific color in the document image and displays the document image as preview on the display device so as to make the detected area editable, and (b) add a text specified by the user operation in the detected area in accordance with the user operation. The output processing unit outputs the document image in which the text was added.

These and other objects, features and advantages of the present disclosure will become more apparent upon reading of the following detailed description along with the accompanied drawings.

BRIEF DESCRIPTION OF THE DRAWINGS

FIG. 3 shows a diagram that indicates an example of a preview screen displayed on the operation panel 4 shown in FIG. 2.

DETAILED DESCRIPTION

Hereinafter, an embodiment according to an aspect of the present disclosure will be explained with reference to drawings.

Figure 1:
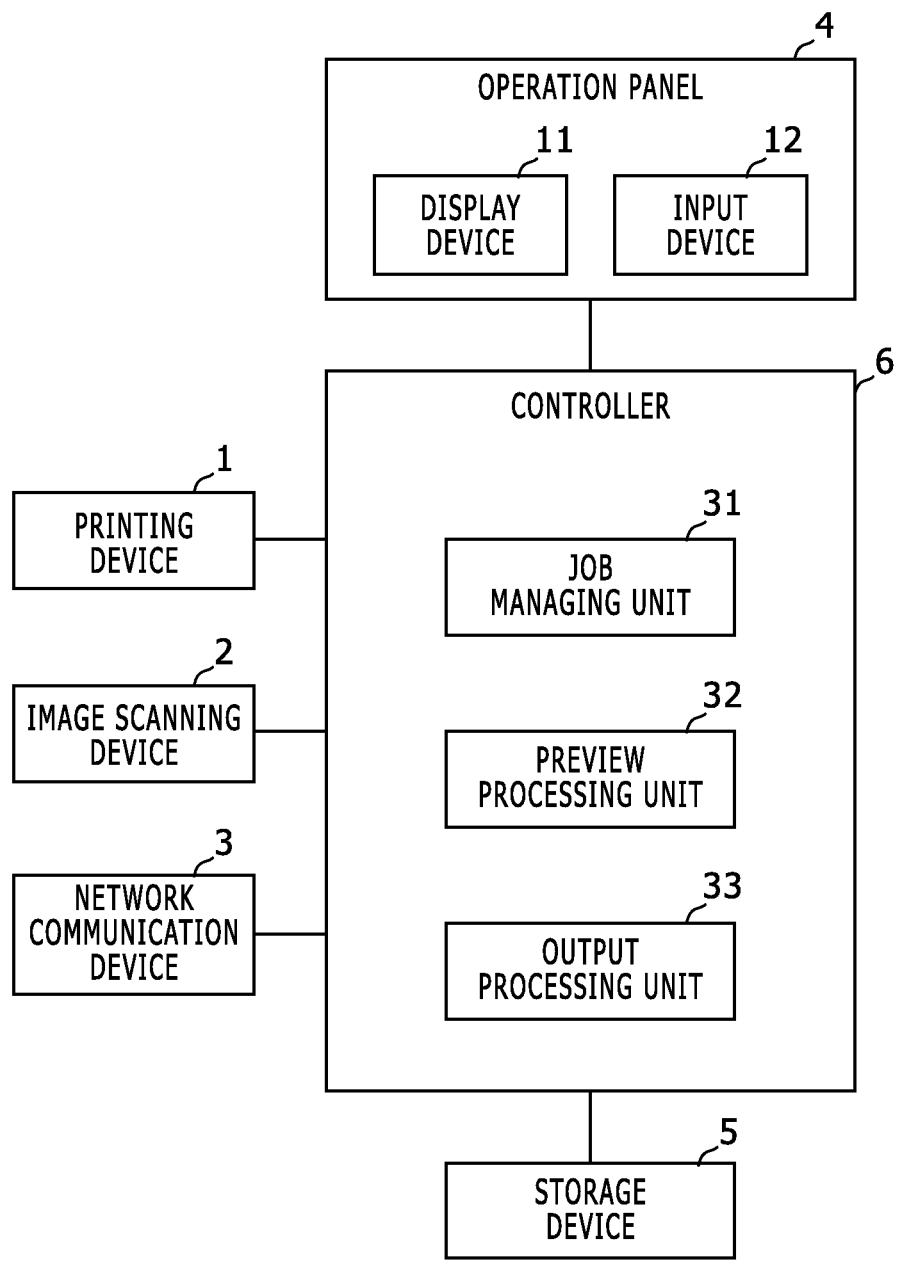
FIG. 1 shows a block diagram that indicates a configuration of an image forming apparatus according to an embodiment of the present disclosure.

FIG. 1 shows a block diagram that indicates a configuration of an image forming apparatus according to an embodiment of the present disclosure. The image forming apparatus shown in FIG. 1 is a multi function peripheral that has a function to perform a specific process such as image scanning, image printing or the like, but may be a printer, a scanner, a copier, a facsimile machine or the like.

The image forming apparatus 1 shown in FIG. 1 includes a printing device 1, an image scanning device 2, a network communication device 3, an operation panel 4, a storage device 5, and a controller 6.

The printing device 1 is an internal device that prints a document image on a printing paper sheet.

The image scanning device 2 is an internal device that scans a document image of a document. For example, the image scanning device 2 includes an automatic document feeder, and can scan plural document images in turn from a document of plural pages using the automatic document feeder.

The network communication device 3 is an internal device that performs data communication with an external device through a network.

Figure 2:
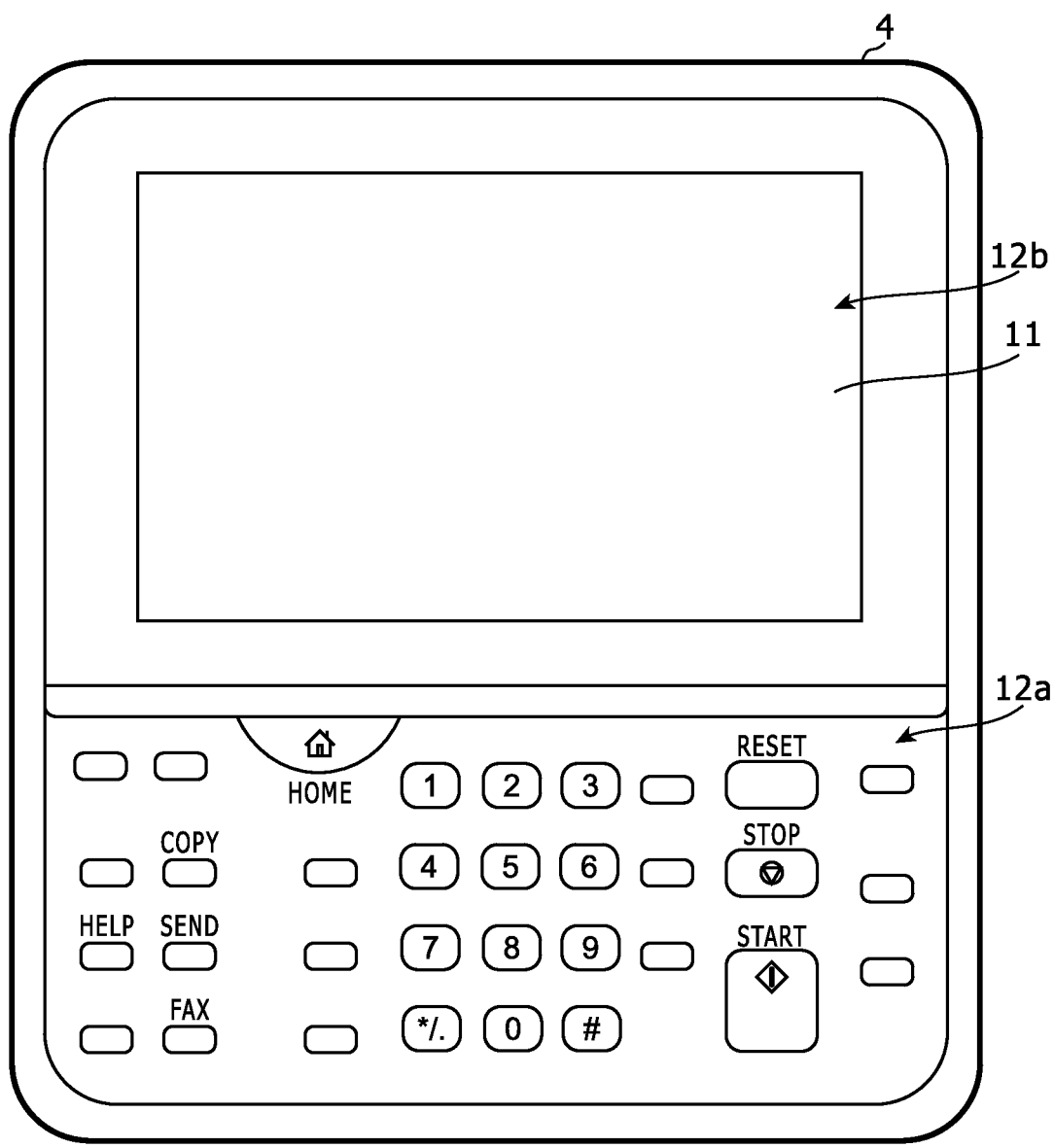
FIG. 2 shows a diagram that indicates an example of an operation panel 4 shown in FIG. 1.

The operation panel 4 is a user interface arranged on a housing of the image forming apparatus, and includes a display device 11 and an input device 12. FIG. 2 shows a diagram that indicates an example of an operation panel 4 shown in FIG. 1. The display device 11 is a device such as a liquid crystal display that displays a screen that includes sorts of information to a user. The input device 12 is a device such as a hard key 12a, a touch panel 12b for a soft key and/or the like that receives a user operation to input an instruction to the image forming apparatus.

The storage device 5 is a non-volatile storage device and stores user data and the like.

The controller 6 includes a micro processor that executes a program, an ASIC (Application Specific Integrated Circuit) and/or the like, and controls the aforementioned internal devices and performs sorts of processes using the micro processor, the ASIC and/or the like. Here, the controller 6 acts as a job managing unit 31, a preview processing unit 32, and an output processing unit 33.

The job managing unit 31 receives a request of sorts of jobs including image printing, image scanning and/or the like, and controls an internal device such as the printing device 1, the image scanning device 2, the network communication device 3 and/or the like in accordance with the request, and thereby performs the requested job. For example, the job managing unit 31 performs a copy job, a scan-to-send job or the like that performs image outputting using these internal devices.

The preview processing unit 32 displays a document image as an output target as preview on the display device 11. Specifically, the preview processing unit 32 (a) detects an area surrounded by a predetermined specific color in the document image and displays the document image as preview on the display device 11 so as to make the detected area editable, and (b) adds a text specified by the user operation in the detected area in accordance with the user operation to the input device 12. Here, the specific color is a chromatic color, for example, such as a color of a specific fluorescence marker pen. Color data indicates such one or plural specific colors (for example, RGB values, ranges of RGB values, or the like) and the color data is stored in the storage device 5 in advance, and the preview processing unit 32 refers to the color data and thereby determines the specific color.

The output processing unit 33 outputs the document image. Here, the output processing unit 33 outputs the document image in which the aforementioned text was added. For example, as image outputting, the output processing unit 33 prints the document image using the printing device 1. Alternatively, as image outputting, the output processing unit 33 generates an image file including the document image (e.g. a PDF file or the like), and saves and/or transmits the image file.

Further, when the preview processing unit 32 detects plural areas surrounded by the specific color, the preview processing unit 32 may (a) add a part of the text in one of the plural areas, and (b) add a subsequent part of the text in another area of the plural areas if the one of the plural areas is filled with the part of the text.

Furthermore, when the preview processing unit 32 detects plural areas surrounded by the specific color, the preview processing unit 32 may (a) add the text in one of the plural areas and (b) also add the text (i.e. the same text) in another area of the plural areas.

Furthermore, in parallel with scanning a subsequent document image, the preview processing unit 32 displays as preview on the display device 11 only the document image in which an area surrounded by the specific color is detected among the plural document images. Consequently, a delay due to the aforementioned preview and the addition of the text is reduced.

Furthermore, the output processing unit 33 may (a) immediately output a document image in which an area surrounded by the specific color is not detected among the plural document images scanned by the image scanning device 2, and (b) thereafter output a document image in which an area surrounded by the specific color is detected among the plural document images immediately after the text is added in the area. Consequently, a delay due to the aforementioned preview and the addition of the text is reduced.

Furthermore, if a character exists in an area surrounded by the specific color, the preview processing unit 32 may add the text after removing the character. In addition, when a character exists in an area surrounded by the specific color, (a) if a predetermined setting data indicates a predetermined value, then the preview processing unit 32 may add the aforementioned text after removing the character, and (b) if the predetermined setting data does not indicate the predetermined value, then the preview processing unit 32 may add the text without removing the character.

The following part explains a behavior of the aforementioned image forming apparatus.

In accordance with a job request from a user, the job managing unit 31 firstly controls the image scanning device 2 and thereby causes the image scanning device 2 to scan a document image, and obtains image data of the document image from the image scanning device 2.

Subsequently, the preview processing unit 32 determines whether the document image includes an area surrounded by the predetermined specific color or not on the basis of the image data.

If it is determined that the document image does not include an area surrounded by the predetermined specific color, then preview processing unit 32 does not display the document image as preview, and the output processing unit 33 immediately outputs the document image.

Contrarily, if it is determined that the document image includes an area surrounded by the predetermined specific color, then preview processing unit 32 displays the document image as preview on the display device 11.

FIG. 3 shows a diagram that indicates an example of a preview screen displayed on the operation panel 4 shown in FIG. 2. For example, as shown in FIG. 3, the preview processing unit 32 displays a frame 52 for text input in an area surrounded by the specific color together with the document image 51 in the preview screen, and also displays a software keyboard 53. A user operation to the software keyboard 53 is detected by the touch panel 12b. When a user operates the software keyboard 53 and thereby inputs a text, the preview processing unit 32 arranges and displays the text in the frame 52.

Afterward, when finishing the input of the text, the preview processing unit 32 terminates displaying the preview screen and the output processing unit 33 performs outputting of the document image in which the text was added.

In the aforementioned embodiment, the preview processing unit 32 (a) detects an area surrounded by a predetermined specific color in the document image and displays the document image as preview on the display device 11 so as to make the detected area editable, and (b) add a text specified by the user operation in the detected area in accordance with the user operation; and the output processing unit 33 output the document image in which the text was added.

Consequently, a user can perform image outputting after adding a desired text in an area specified on a document using a marker.

It should be understood that various changes and modifications to the embodiments described herein will be apparent to those skilled in the art. Such changes and modifications may be made without departing from the spirit and scope of the present subject matter and without diminishing its intended advantages. It is therefore intended that such changes and modifications be covered by the appended claims.

For example, in the aforementioned embodiment, a font size of the added text may be automatically set in accordance with (a) a size of the aforementioned area (i.e. the frame 52) and (b) the number of characters in the added text. In such a case, the larger size of the aforementioned area (the frame 52) results in the larger font size, and the larger number of characters in the added text results in the smaller font size.

Further, in the aforementioned embodiment, it may be set using setting data (a) whether a series of the text is divided into parts and the parts are added in the plural areas in turn or not, and (b) whether the added text is also added to another area surrounded by the same specific color or not.

Furthermore, in the aforementioned embodiment, such plural specific colors different from each other may be associated with each other, and if a text is added to an area surrounded by one of the plural specific colors, then preview processing unit 32 may add the same text in an area surrounded by another specific color associated with the one of the plural specific colors.

Furthermore, in the aforementioned embodiment, when a series of the text is divided into parts and the parts are added in the plural areas in turn, the plural areas may include an area in a page and an area in another page. Furthermore, in the aforementioned embodiment, when the text added to an area surrounded by a specific color is also added to another area surrounded by the same specific color, the another area may be an area in another page than a page where the text is originally added.

What is claimed is:

1. An image forming apparatus, comprising:
    a display device;
    an input device configured to receive a user operation;
    a preview processing unit configured to display as preview on the display device a document image as an output target; and
    an output processing unit configured to output the document image;

wherein the preview processing unit (a) detects an area surrounded by a predetermined specific color in the document image and displays the document image as preview on the display device so as to make the detected area editable, and (b) adds a text specified by the user operation in the detected area in accordance with the user operation; and the output processing unit outputs the document image in which the text was added.

2. The image forming apparatus according to claim 1, wherein when the preview processing unit detects plural areas surrounded by the specific color, the preview processing unit adds a part of the text in one of the plural areas, and if the one of the plural areas is filled with the part of the text, the preview processing unit adds a subsequent part of the text in another area of the plural areas.

3. The image forming apparatus according to claim 1, wherein when the preview processing unit detects plural areas surrounded by the specific color, the preview processing unit adds the text in one of the plural areas, and also adds the text in another area of the plural areas.

4. The image forming apparatus according to claim 1, further comprising an image scanning device configured to scan plural document images from a document of plural pages;

wherein in parallel with scanning a subsequent document image, the preview processing unit displays as preview on the display device only the document image in which an area surrounded by the specific color is detected among the plural document images.

5. The image forming apparatus according to claim 1, further comprising an image scanning device configured to scan plural document images from a document of plural pages;

wherein the output processing unit immediately outputs a document image in which an area surrounded by the specific color is not detected among the plural document images, and thereafter outputs a document image in which an area surrounded by the specific color is detected among the plural document images immediately after the text is added in the area.

6. The image forming apparatus according to claim 1, wherein if a character exists in an area surrounded by the specific color, the preview processing unit adds the text after removing the character.

7. The image forming apparatus according to claim 1, wherein the text added by the user will have a font size that is determined in accordance with a size of an input frame and an amount of text added by the user; said input frame being an area in which the user inputs the text to be added.

8. The image forming apparatus according to claim 1, wherein the preview processing unit detects other areas surrounded by the predetermined specific color in the document image and inserts the text added by the user to the other areas surrounded by the predetermined specific color.

9. The image forming apparatus according to claim 1, wherein the preview processing unit detects other areas surrounded by another predetermined specific color in the document image and inserts the text added by the user to the other areas surrounded by other predetermined specific color.

10. The image forming apparatus according to claim 1, wherein the text added by the user is divided into parts and the parts are added to plural areas.

* * * * *